(12) United States Patent
Pham et al.

(10) Patent No.: US 10,585,586 B2
(45) Date of Patent: Mar. 10, 2020

(54) ELECTRONIC APPARATUS, METHOD FOR CONTROLLING THEREOF AND THE COMPUTER-READABLE RECORDING MEDIUM

(71) Applicant: Samsung Electronics Co., Ltd., Suwon-si, Gyeonggi-do (KR)

(72) Inventors: Van Tien Pham, Hanoi (VN); Minh Phuong Pham, Namdinh (VN); Ba Dung Nguyen, Nghi Loc District (VN); Hoang Phuc Nguyen, Ha Noi (VN); Van Tien Nguyen, Ha Noi (VN); Ba Tung Pham, Binh Xuyen District (VN); Dinh Tai Phung, Vu Ban District (VN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/011,943

(22) Filed: Jun. 19, 2018

(65) Prior Publication Data
US 2019/0220188 A1 Jul. 18, 2019

(30) Foreign Application Priority Data
Jan. 12, 2018 (KR) .................. 10-2018-0004168

(51) Int. Cl.
*G06F 3/0489* (2013.01)
*G06F 3/0481* (2013.01)
(Continued)

(52) U.S. Cl.
CPC .......... *G06F 3/04895* (2013.01); *G06F 3/013* (2013.01); *G06F 3/015* (2013.01); *G06F 3/0236* (2013.01); *G06F 3/0481* (2013.01)

(58) Field of Classification Search
CPC ....... G06F 3/015; A61B 5/0476; A61B 5/048; A61B 5/165; A61B 5/0006;
(Continued)

(56) References Cited

U.S. PATENT DOCUMENTS

| 6,173,259 B1 | 1/2001 | Bijl et al. |
| 2005/0017870 A1* | 1/2005 | Allison ............... G06F 3/015 340/4.13 |

(Continued)

FOREIGN PATENT DOCUMENTS

| CN | 101201696 A | 6/2008 |
| CN | 101515199 A | 8/2009 |
| CN | 102508545 A | 6/2012 |

OTHER PUBLICATIONS

Choi; Jong-Suk et al, "Enhanced Perception of User Intention by Combining EEG and Gaze-Tracking for Brain-Computer Interfaces (BCIs)." Sensors, vol. 13, No. 3, 2013, pp. 3454-3472, doi:10.3390/s130303454 (Year: 2013).*

(Continued)

*Primary Examiner* — Koosha Sharifi-Tafreshi

(57) ABSTRACT

An electronic apparatus, a method, and computer-readable medium are disclosed. The electronic apparatus includes a communicator, a display, and a processor. The communicator is configured to obtain a brainwave signal. The processor is configured to display on the display a character input window and a keyboard UI including a plurality of character keys. The processor is also configured to identify a character key to input to the character input window from the plurality of character keys based on at least one channel signal from the obtained brain wave signal. The channel signal includes a F7 channel, a F8 channel, and an AF3 channel. The processor is also configured to display a character corresponding to the identified character key to the character input window.

14 Claims, 19 Drawing Sheets

1000

(51) Int. Cl.
*G06F 3/023* (2006.01)
*G06F 3/01* (2006.01)

(58) Field of Classification Search
CPC . A61B 5/04842; A61B 5/0478; A61B 5/0482; A61B 5/4821; A61B 5/6803; A61B 5/7264; A61M 2230/10
See application file for complete search history.

(56) References Cited

U.S. PATENT DOCUMENTS

| | | | | |
|---|---|---|---|---|
| 2006/0125659 | A1* | 6/2006 | Kim | G06F 3/015 341/20 |
| 2008/0154148 | A1* | 6/2008 | Chung | G06F 3/015 600/544 |
| 2013/0158883 | A1* | 6/2013 | Hasegawa | A61B 5/0476 702/19 |
| 2013/0265227 | A1 | 10/2013 | Julian | |
| 2014/0228701 | A1* | 8/2014 | Chizeck | A61B 5/04012 600/544 |
| 2015/0082244 | A1* | 3/2015 | Sohn | G06F 3/015 715/822 |

OTHER PUBLICATIONS

Chambayi; Brijil et al, "Virtual Keyboard BCI using Eye blinks in EEG", 2010 IEEE 6th International Conference on Wireless and Mobile Computing, Networing and Communications, 2010, doi:10. 1109/wimob.2010.5645025 (Year: 2010).*

BrainBots; "A Brain Controlled On-Screen Keyboard using SSVEP", YouTube, https://www.youtube.com/watch?v=yBker7B0X1A, Jul. 3, 2017 (Year: 2017).*

Orhan, U., Hild, K., Erdogmus, D., Roark, B., Oken, B. and Fried-Oken, M. (2019). RSVP keyboard: An EEG based typing interface.] (Year: 2019).*

Jun Jiang, Zongtan Zhou,, Erwei Yin, Yang Yu and Dewen Hu. (2014). Hybrid Brain-Computer Interface (BCI) based on the EEG and EOG signals (Year: 2014).*

Chambayil, Brijil, et al., "Virtual Keyboard BCI using Eye blinks in EEG," 2010 IEEE 6th International Conference on Wireless and Mobile Computing, Networking and Communications, 2010, IEEE, 5 pages.

Mugler, et al., "Control of an Internet Browser Using the P300 Event-Related Potential," International Journal of Bioelectromagnetism, ISBEM, vol. 10, No. 1, pp. 56-63, 2008.

Samadi, et al., "EEG Signal Processing for Eye Tracking," Proceedings of the 22nd European Signal Processing Conference (EUSIPCO), pp. 2030-2034, Sep. 2014.

* cited by examiner

1000

100

200

10

ELECTRONIC APPARATUS, METHOD FOR CONTROLLING THEREOF AND THE COMPUTER-READABLE RECORDING MEDIUM

CROSS-REFERENCE TO RELATED APPLICATIONS AND CLAIM OF PRIORITY

This application claims priority from Korean Patent Application No. 110-2018-0004168, filed on Jan. 12, 2018 in the Korean Intellectual Property Office, the disclosure of which is incorporated herein by reference in its entirety.

BACKGROUND

Apparatuses and methods consistent with exemplary embodiments of the present disclosure relate to an electronic apparatus, a controlling method thereof, and a computer-readable recording medium, and more particularly, to an electronic apparatus for inputting a text in real time using brainwaves corresponding to eye movement, a controlling method thereof, and a computer-readable recording medium.

With the development of various types of display devices (e.g., TVs, cell phones, notebooks, PDAs, etc.), users are often faced with situations where they have to manipulate the display device in their daily lives. In a general method of operating a display device, a user inputs an input command through an input means such as a button, a switch, a wheel, a touch, or the like. At this time, the user uses hands to operate the input means.

However, accurate manipulation of a hand is required on a small button or a soft keyboard, and when the hand cannot be used, it is inconvenient to operate the display device.

Accordingly, a method of controlling the display device by using the user's brainwave, especially the P300 signal, or by sensing the motion of the user's eyeball has been developed.

However, the P300 signal has a problem of low accuracy, as the P300 signal requires external stimuli, feedback is slow, and it is affected by external stimuli such as sound. A method of physically detecting the movement of the eyeball has also been problematic in that the accuracy is low and the feedback is delayed to perform the control using the method.

Accordingly, there has been a need for controlling the display device more quickly and accurately without using a hand.

SUMMARY

Exemplary embodiments address at least the above problems and/or disadvantages and other disadvantages not described above. Also, the exemplary embodiments are not required to overcome the disadvantages described above, and may not overcome any of the problems described above.

The present disclosure has been made in view of the above needs, and an object of the present disclosure is to provide an electronic apparatus, a control method thereof, and a computer readable recording medium capable of inputting text in real time using brainwaves corresponding to eye movement.

According to an exemplary embodiment, an electronic apparatus includes a communicator, a display, and a processor configured to control the display to display a character input window and a keyboard UI including a plurality of character keys, identify a character key which is to be input from among the plurality of character keys using at least one channel signal from among F7 channel, F8 channel, and AF3 channel among a brainwave signal obtained through the communicator, and display a character corresponding to the identified character key to the character input window.

The obtained brainwave signal may be obtained in accordance with a movement operation of a user's gaze in four directions or eye blinking operation.

The processor may identify a waveform of the obtained brainwave signal and identifies a character key to be input based on the identified waveform of the obtained brainwave signal.

The processor may divide the obtained brainwave signal into a plurality of sections and identify the waveform of the obtained brainwave signal using an average value of the signal values of each section.

The obtained brainwave signal may include a signal of the F7 channel and a signal of the F8 channel, and a waveform of the F7 channel signal and the F8 channel signal are convex upwardly or convex downwardly according to a left, right, or downward movement of a user's gaze.

The obtained brainwave signal may further include a signal of an AF3 channel, and a width of a waveform of the AF3 channel signal is different according to an upward movement of the user's gaze or eye blinking.

The processor may change the displayed plurality of character keys to at least one character key corresponding to the obtained brainwave signals from among the displayed plurality of character keys based on a waveform of the obtained brainwave signal.

The processor may control the display to display at least one word or at least one web page address associated with a first character entered based on the obtained brainwave signal.

According to an exemplary embodiment, a controlling method of an electronic apparatus includes displaying a character input window and a keyboard UI including a plurality of character keys; identifying a character key which is to be input from among the plurality of character keys using at least one channel signal from among F7 channel, F8 channel, and AF3 channel among brainwave signal obtained; and displaying a character corresponding to the identified character key to the character input window.

The obtained brainwave signal may be determined in accordance with a movement operation of a user's gaze in four directions or eye blinking operation.

The identifying may include identifying a waveform of the obtained brainwave signal and identifying a character key to be input based on the identified waveform of the obtained brainwave signal.

The identifying may include dividing the Obtained brainwave signal into a plurality of sections and identifying the waveform of the obtained brainwave signal using an average value of the signal values of each section.

The obtained brainwave signal may include a signal of the F7 channel and a signal of the F8 channel, and a waveform of the F7 channel signal and the F8 channel signal are convex upwardly or convex downwardly according to a left, right, or downward movement of a user's gaze.

The obtained brainwave signal may further include a signal of an AF3 channel, and a width of a waveform of the AF3 channel signal is different according to an upward movement of the user's gaze or eye blinking.

The method may further include changing the displayed plurality of character keys to at least one character key corresponding to the obtained brainwave signals from among the displayed plurality of character keys.

The method may further include displaying at least one word or at least one web page address associated with a first character entered based on the brainwave signal based on a waveform of the obtained brainwave signal.

A computer-readable recording medium including a program for executing a controlling method of an electronic apparatus, wherein the controlling method includes displaying a character input window and a keyboard UI including a plurality of character keys; identifying a character key which is to be input from among the plurality of character keys using at least one channel signal from among F7 channel, F8 channel, and AF3 channel among a brainwave signal obtained; and displaying a character corresponding to the identified character key to the character input window.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
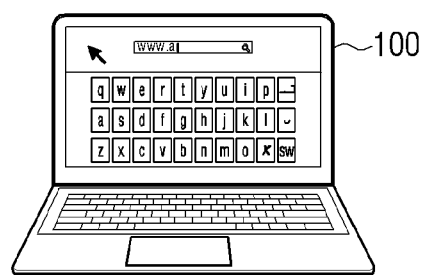
FIG. 1 illustrates a view to describe a character input system using a brainwave according to various embodiments of the present disclosure.
Figure 1:
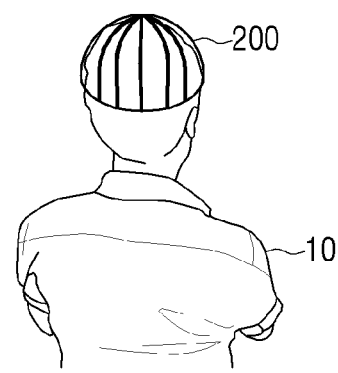

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Exemplary embodiments are described in greater detail below with reference to the accompanying drawings.

All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms are arbitrarily selected by the applicant. These terms may be construed in the meaning defined herein and, unless otherwise specified, may be construed on the basis of the entire contents of this specification and common technical knowledge in the art.

In other words, the disclosure is not limited to an embodiment disclosed below and may be implemented in various forms and the scope of the disclosure is not limited to the following embodiments. In addition, all changes or modifications derived from the meaning and scope of the claims and their equivalents should be construed as being included within the scope of the present disclosure. In the following description, the configuration which is publicly known but irrelevant to the gist of the present disclosure could be omitted.

In the present disclosure, relational terms such as first and second, and the like, may be used to distinguish one entity from another entity, without necessarily implying any actual relationship or order between such entities.

The terms used in the following description are provided to explain a specific exemplary embodiment and are not intended to limit the scope of rights. A singular term includes a plural form unless it is intentionally written that way. The terms, "include", "comprise", "is configured to", etc. of the description are used to indicate that there are features, numbers, steps, operations, elements, parts or combination thereof and they should not exclude the possibilities of combination or addition of one or more features, numbers, steps, operations, elements, parts or combination thereof.

In an exemplary embodiment, 'a module' or 'a unit' performs at least one function or operation, and may be realized as hardware, software, or combination thereof. In addition, a plurality of 'modules' or a plurality of 'units' may be integrated into at least one module and may be realized as at least one processor (not shown) except for 'modules' or 'units' that should be realized in a specific hardware.

Hereinafter, embodiments will be described in greater detail with reference to the accompanying drawings. A thickness and spacing are presented for convenience of explanation, and could be exaggerated compared to an actual physical thickness in the following description, the configuration which is publicly known but irrelevant to the gist of the present disclosure could be omitted. In addition, with regard to adding the reference numerals to constituent elements of each drawing, it should be noted that like reference numerals in the drawings denote like elements even though shown on the other drawings.

Hereinbelow, the present disclosure will be described in a greater detail with reference to drawings.

FIG. 1 illustrates a view to describe a character input system using a brainwave according to various embodiment of the present disclosure.

Referring to FIG. 1, a character input system 1000 includes an electronic apparatus 100 and an external device 200 which a user 10 wears.

The electronic apparatus 100 can operate based on a user's operation command. Specifically, the electronic apparatus 100 can move a pointer, reproduce the content, and input characters into the character input window according to a user's operation command. Here, the pointer which moves freely on a screen indicates contents to be selected, and may have various shapes according to display environments such as an arrow shape, an I shape, and a cross shape.

At this time, the electronic apparatus 100 can receive a user's operation command through a mouse, a keyboard, a remote controller, a touch screen, etc., but can detect a user's gaze and perform an operation corresponding to the detected gaze.

At this time, the electronic apparatus 100 can detect the user's gaze using a provided camera or the like. However, by using the user's brainwave signal received from the external device 200 worn by the user 10, the electronic apparatus may perform an operation corresponding to the signal.

Here, the electronic apparatus 100 may be various devices having a display such as a TV, a mobile phone, a smart phone, a FDA, a notebook PC, a monitor, a tablet PC, an electronic book, an electronic photo frame, a kiosk. In addition, the electronic apparatus 100 may be a household appliance such as a refrigerator or a washing machine having a display.

In this case, the electronic apparatus 100 can display a UI screen for receiving a user's operation command. Specifically, the electronic apparatus 100 may display an icon for application execution, a pointer or highlight for application selection, a character input window, a keyboard UI including a plurality of character keys for selecting characters to be input in the character input window. Although FIG. 1 shows a keyboard UI in which a plurality of character keys are arranged in a lattice form, various types of keyboard UIs such as a QWERTY keyboard and a numeric keypad can be used in actual implementation.

At this time, the electronic apparatus 100 can move the pointer or highlight using the brainwave signal received from the external device 200, or can select the icon. Here, the movement of the pointer or the highlight may correspond to the movement of the user's gaze. The electronic apparatus 100 can display a keyboard UI including a plurality of character keys when the user executes an application requiring character input or focuses on a character input window based on the brainwave signal. Then, the electronic apparatus 100 can input a character using the brainwave signal received after displaying the keyboard UI. At this time, a bar-shaped cursor which illustrates a character input mode can blink in a character input window.

When a brainwave signal corresponding to an operation for selecting a different part other than the keyboard UI is received while the keyboard UI is displayed, the electronic apparatus 100 can remove the keyboard UI and perform an operation corresponding to the brainwave signal.

In the meantime, the electronic apparatus 100 may be a variety of devices such as a server, a set-top box, etc., without a display. In this case, the electronic apparatus 100 can transmit the UI screen to the external display device.

The external device 200 is a device for measuring brainwaves. Specifically, the external device 200 may include a plurality of electrodes for brainwave measurement. At this time, the plurality of electrodes are in contact with the scalp of the user 10 to obtain an electric signal. Here, the electronic apparatus 100 can receive electrical signals obtained on each electrode through respective channels.

One embodiment of the arrangement of a plurality of electrodes contacting the scalp of the user 10 will be described in detail with reference to FIG. 4, but the number and arrangement of the plurality of electrodes are not limited to those shown in FIG. 4.

The external device 200 may include only a plurality of electrodes. The external device 200 may have a configuration in which a plurality of electrodes are connected to each other by at least one band so that the user 10 can easily wear the device, or a plurality of electrodes are attached to a cap.

Figure 2:
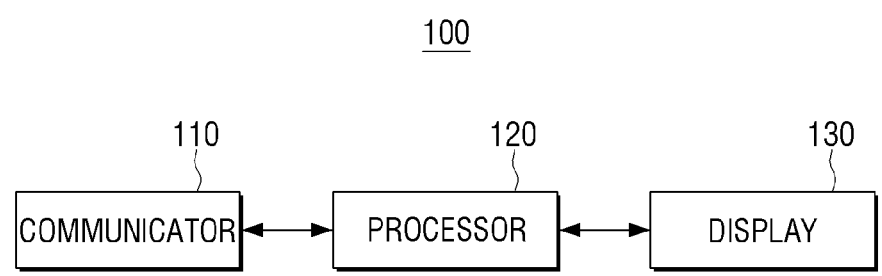
FIG. 2 illustrates a block diagram of a brief configuration of an electronic apparatus according to various embodiments of the present disclosure.

FIG. 2 illustrates a block diagram of a brief configuration of an electronic apparatus according to various embodiment of the present disclosure.

Referring to FIG. 2, the electronic apparatus 100 includes a communicator 110, a processor 120, and a display 130.

The communicator 110 is configured to perform communication with an external device. Specifically, the communicator 110 can receive a brainwave signal from an external device. At this time, the communicator 110 can receive a brainwave signal in a wired or wireless manner. Specifically, the communicator 110 can receive a brainwave signal in a wireless manner such as a wireless LAN, a Bluetooth, a Wifi, or the like. Meanwhile, the communicator 110 may include a port connected to an external device in a wired manner to receive a brainwave signal.

Meanwhile, the communicator 110 can receive contents from the external contents providing apparatus. At this time, the communicator 110 can perform communication with various types of external content providing apparatuses according to a communication method. Specifically, the communicator 110 may be connected to an external device in a wireless manner such as a wireless LAN, Bluetooth, or the like. In addition, the communicator 110 may be connected to an external device using Wi-Fi, ZigBee, or IrDA. Meanwhile, the communicator 110 may include a wired connection port. At this time, the communicator 110 may include a wired Ethernet, a high definition multimedia interface (HDMI) port, a component port, a PC port, a USB port, and the like. In addition, the communicator 110 may include Digital Visual Interface (DVI), Red Green Blue (RGB), DSU, and super video (S-Video).

The processor 120 may control overall operations and functions of the electronic apparatus 100. To be specific, the processor 120 may perform an operation corresponding to the brainwave signal received from an external apparatus.

First, the processor 120 may control the display 130 to display a character input window and a keyboard UI including a plurality of character keys. Specifically, the processor 120 may control the display 130 to display a keyboard UI including a plurality of character keys, when the user sets the focus of gaze on the character input window displayed on the display 130. In another embodiment, when the user executes an application that requires text input, the processor 120 may control the display 130 to display a text input window and a keyboard UI. At this time, the focus of the user's gaze and whether or not the application is executed may be identified by a brainwave signal received from an external device or by an operation command input through input means other than a brainwave signal such as a voice input, a mouse, a remote control.

The processor 120 can identify a character key to be input among a plurality of character keys of the keyboard UI by using a brainwave signal received through the communicator 110. Specifically, the processor 120 can identify the waveform of the received brainwave signal and identify the character key to be input based on the identified waveform.

At this time, the brainwave signal is obtained from an external device, and may be obtained in accordance with a user's eye movement operation in four directions or eye blinking operation.

Figure 4:
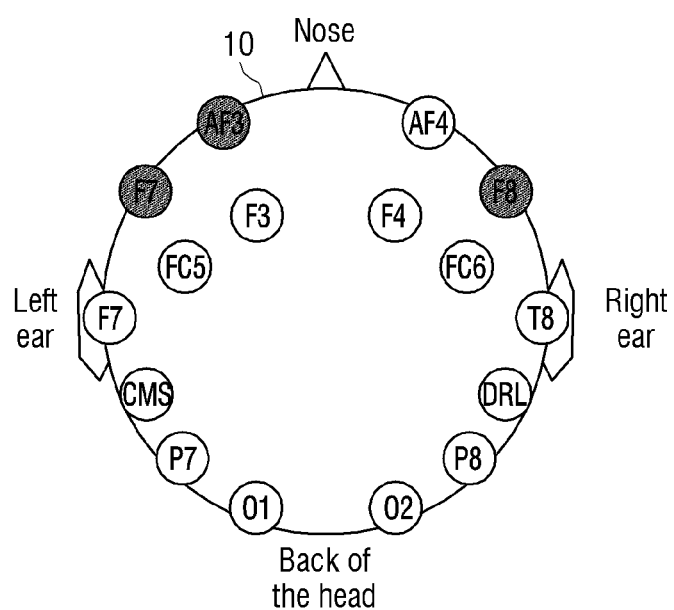
FIG. 4 illustrates a view to describe an exemplary embodiment of an electrode channel for measuring brainwave according to various embodiments of the present disclosure.

To be specific, as illustrated in FIG. 4, the processor 120 may use some of the brainwave signals received from the external device 200 including a plurality of electrodes disposed at predetermined positions of the scalp of the user 10, thereby determining the operation of the user's eyes.

FIG. 4 illustrates a state of viewing the user 10 wearing the external device 200 from an upper side. The arrangement of the plurality of electrodes is based on the 10-20 International Nomenclature and is used for brainwave (Electroencephalogram) test and it is an internationally well-known arrangement method.

Here, a brainwave signal used to determine the operation of the user's eyes may be a signal of F7, F8, and AF3 channels.

In the meantime, brainwave signals having different waveforms according to eye blinking operations or gaze movements of the user, the processor 120 may analyze a waveform of each brainwave signal to determine a movement of the eyes of a user.

Specifically, the signal of the F7 channel, the signal of the F8 channel, and the signal of the AF3 channel among the brainwave signals are obtained as shown in the following Table 1 according to the movement of the user's eyes as shown in the following table FIGS. 5 to 9 showing brainwaves corresponding to eye movements will be described together for convenience of explanation

TABLE 1

| Eye movement | F7 | F8 | AF3 |
|---|---|---|---|
| Gaze Right | Signal goes down (DOWN) | Signal goes up (UP) | Do not care |
| Gaze Left | Signal goes up (UP) | Signal goes down (DOWN) | Do not care |
| Gaze Down | Signal goes down (DOWN) | Signal goes down (DOWN) | Do not care |
| Gaze Up | Signal goes up (UP) | Signal goes up (UP) | Signal goes up, with wider pulse (WIDE_UP) |
| Blink | Signal goes up (UP) | Signal goes up (UP) | Signal goes up, with narrower pulse (NARROW_UP) |

Figure 5:
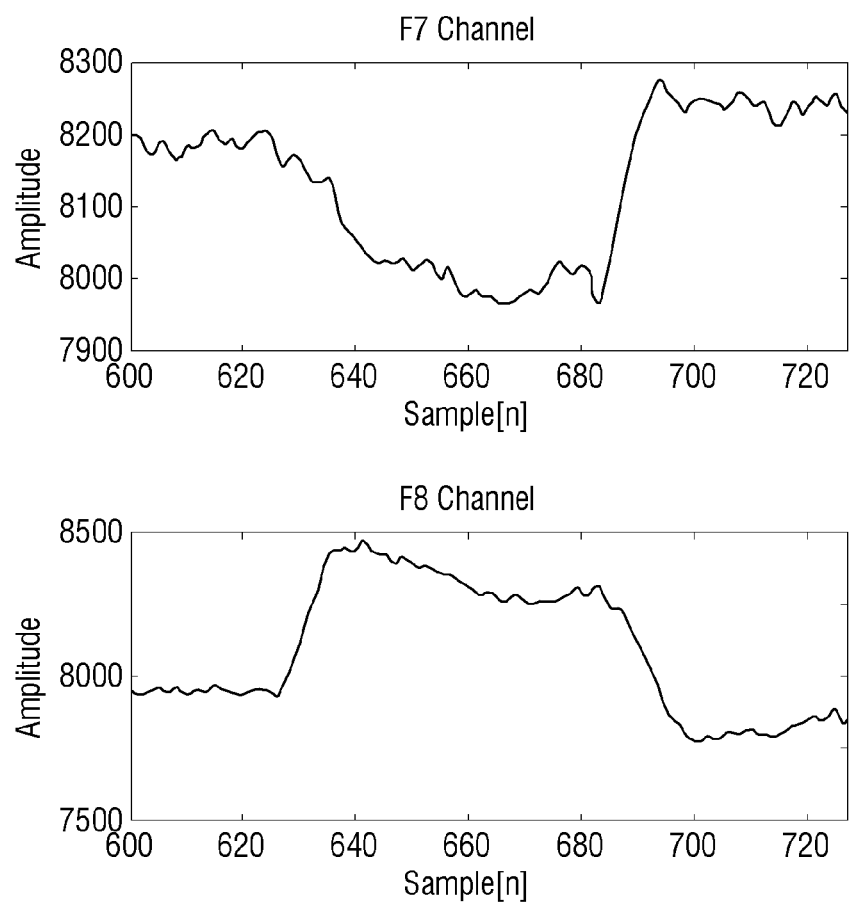
FIGS. 5-9 illustrate views to describe a brainwave signal corresponding to a movement of eyes according to various embodiments of the present disclosure.

Table 1 shows the waveforms of the brainwave signals corresponding to the movement operation of the user's gaze in four directions and the eye blinking operation, Specifically, referring to Table 1, when the user's gaze moves to the right, the signal of the F7 channel goes down and the signal of the F8 channel goes up. As a result, when the user's gaze moves to the right, the waveform of the signal of the F7 channel is convex downward and the signal of the F8 channel is convex upward as shown in FIG. 5

That is, if the waveform of the signal of the F7 channel among the brainwave signals obtained through the communicator 110 is convex downward and the waveform of the signal of the F8 channel is convex upward, the processor 120 may perform an operation corresponding to a user's gaze which moves to the right.

Figure 6:
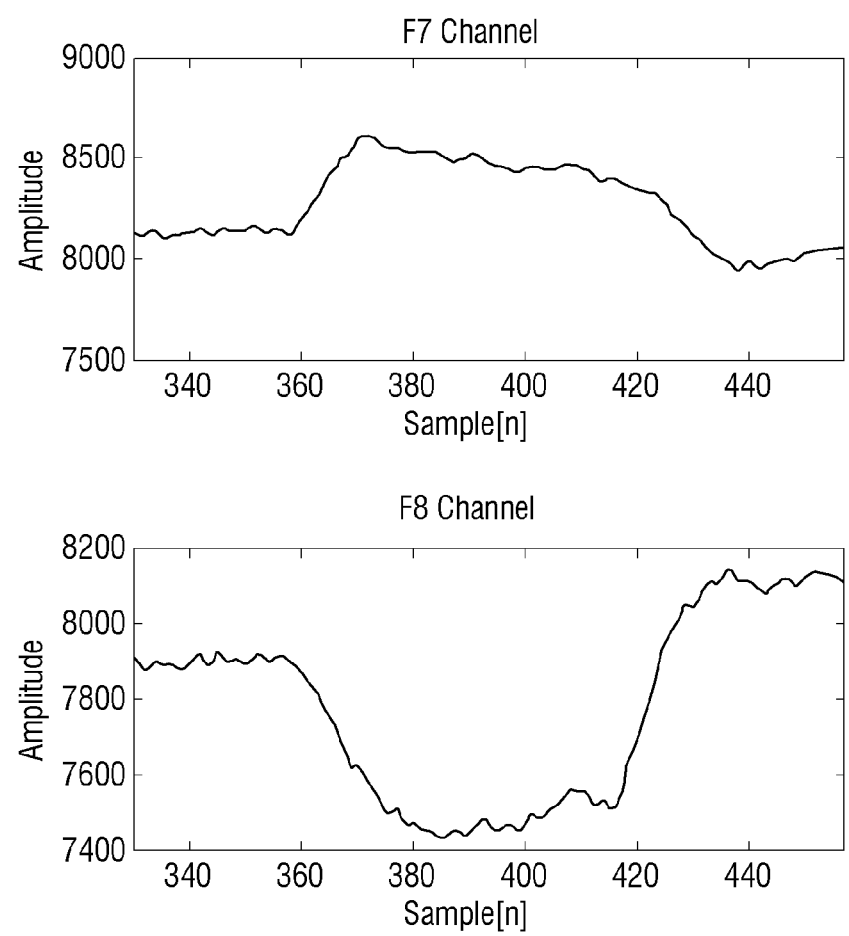

Then, when the user's gaze moves to the left, the signal of the F7 channel goes up and the signal of the F8 channel goes down. As a result, when the user's gaze moves to the left, the waveform of the signal of the F7 channel is convex upwardly and the signal of the F8 channel is convex downwardly, as shown in FIG. 6.

That is, when the waveform of the F7 channel signal of the brainwave signal acquired through the communicator 110 is convex upwardly and the waveform of the signal of the F8 channel is convex downwardly, the processor 120 may perform an operation corresponding to the user's gaze which moved to the left side.

Figure 7:
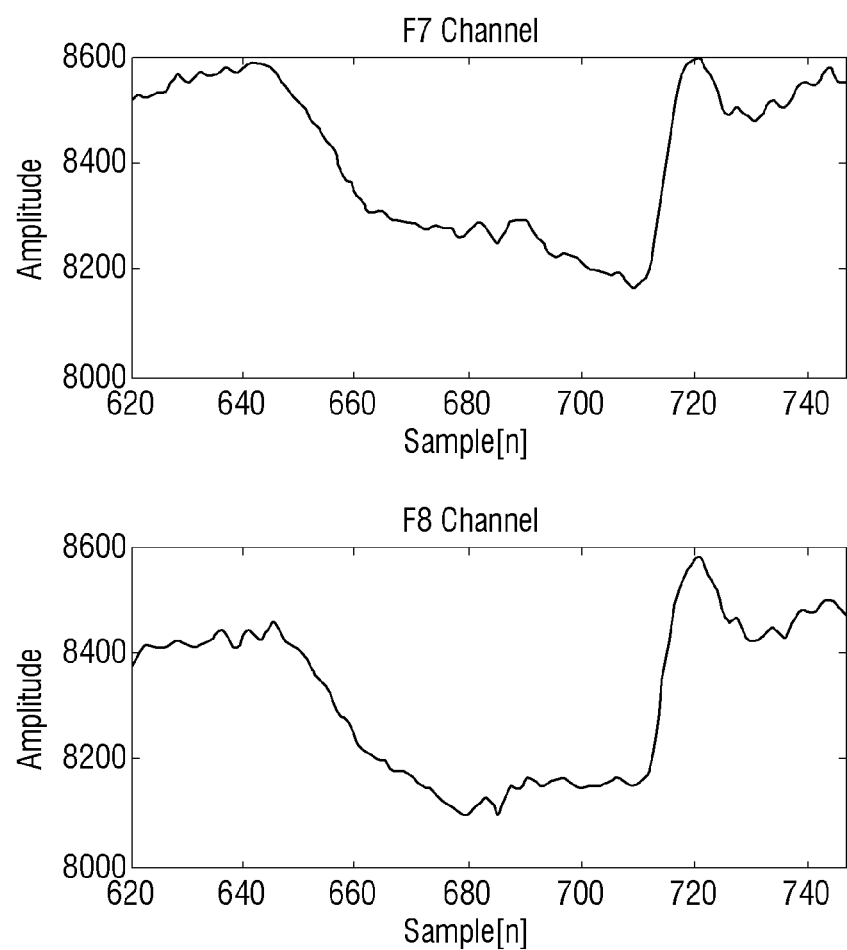

Then, when the user's gaze moves downwardly, the signal of the F7 channel goes up and the signal of the F8 channel goes up as well. As a result, when the user's gaze moves downwardly, the waveform of the signal of the F7 channel is convex downwardly and the signal of the F8 channel is convex downwardly as shown in FIG. 7.

That is, if the waveform of the signal of the F7 channel among the brainwave signals obtained through the communicator 110 is convex downwardly and the waveform of the signal of the F8 channel among the brainwave signals obtained through the communicator 110 is also convex downwardly, the processor 120 may perform an operation to correspond to the user's gaze moving downwardly.

When the user's gaze moves upwardly and the user blinks, the signal of the F7 channel and the signal of the F8 channel all go up. That is, the waveform of the signal of the F7 channel and the F8 channel alone cannot distinguish the user's gaze from the upward movement and the blinking operation. At this time, the processor 120 can further distinguish between the two operations by using signals of the AF3 channel.

Figure 8:
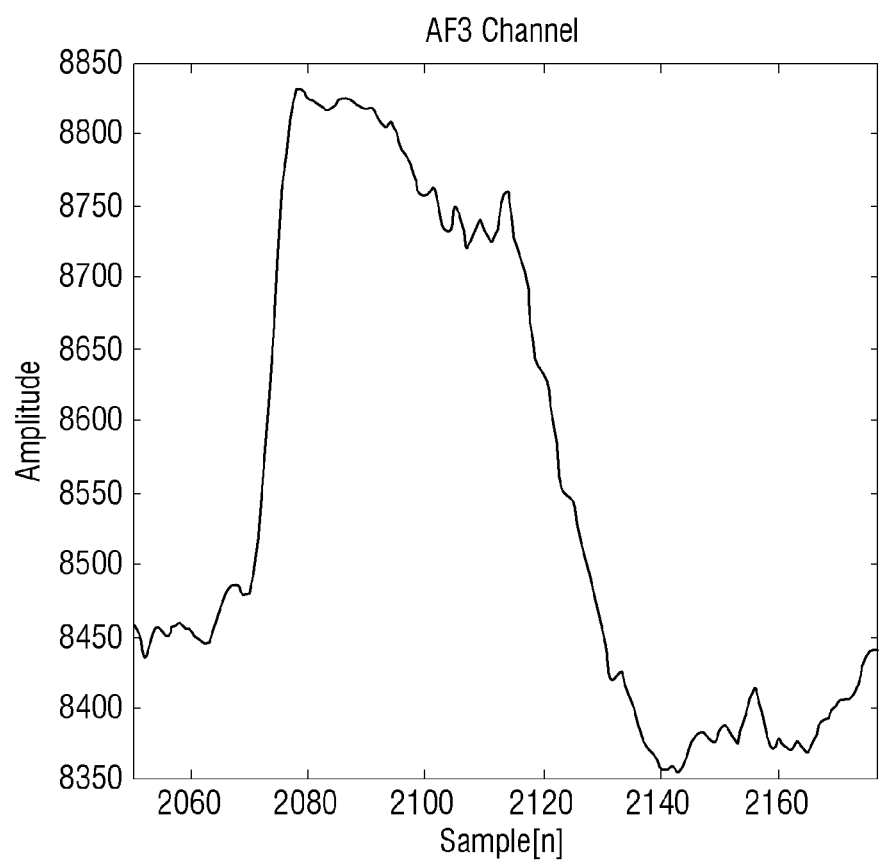

Specifically, when the user's gaze moves upwardly, the waveform of the signal of the AF3 channel rises (signal goes up) and is wide in width. For example, as shown in FIG. 8, the waveform of the signal of the AF3 channel is convex upwardly, and the width of the graph is wide.

Figure 9:
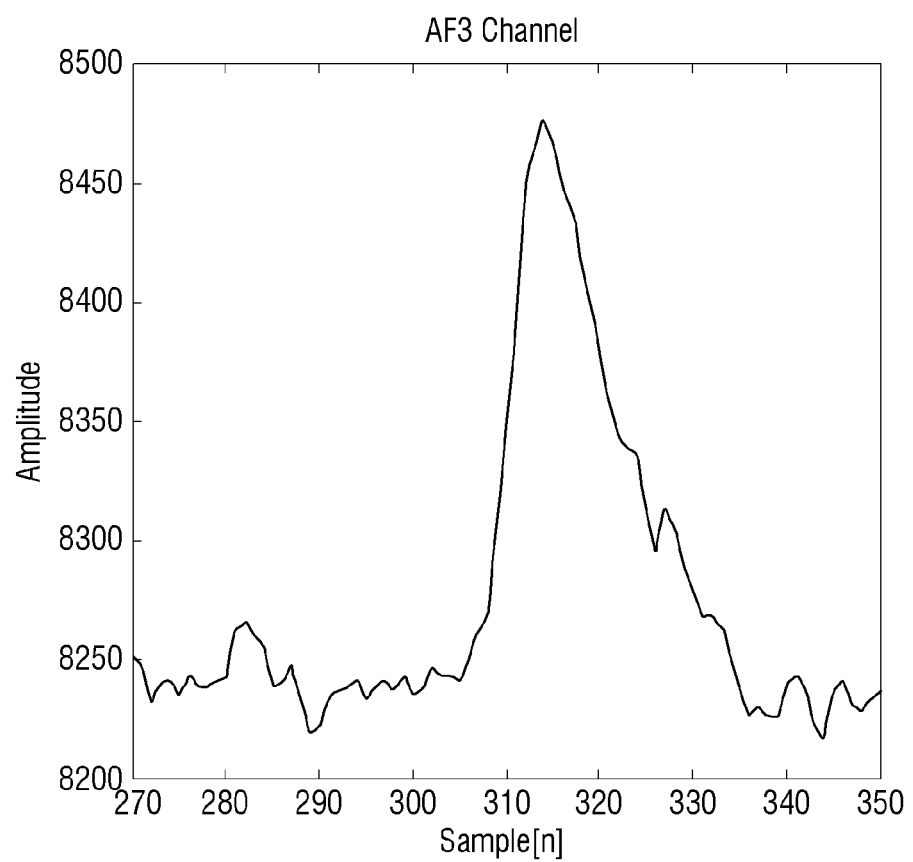

When the user blinks, the waveform of the signal of the AF3 channel rises (signal goes up), and the width is narrow. For example, as shown in FIG. 9, the waveform of the AF3 channel signal is convex upwardly, and the width of the graph is narrow.

That is, when the waveforms of the F7 channel signal and the channel signal of the brainwave signals acquired through the communicator 110 are all convex upwardly, the processor 120 performs an operation corresponding to the waveform width of the AF3 channel signal. Specifically, when the waveform of the signal of the AF3 channel is wide, the processor 120 performs an operation corresponding to the upward movement of the user's eye, and performs an operation corresponding to the blinking operation if the width is narrow. The operation of identifying the waveform width of the AF3 channel signal will be described in detail with reference to FIG. 13.

Meanwhile, as described above, an embodiment of a process of identifying a user's eye movement according to a waveform of a brainwave signal will be described in detail with reference to FIG. 11.

Meanwhile, the processor 120 can grasp the waveform of the brainwave signal obtained in various ways. Specifically, the processor 120 divides the obtained brainwave signal into a plurality of sections, and can identify the waveform of the brainwave signal obtained using the average value of the signal values of each section. This waveform identification operation will be described in more detail below with reference to FIG. 12.

The processor 120 controls the display 130 to display the plurality of character keys displayed by changing the displayed character keys into at least one character key corresponding to the waveform of the brainwave signal among the plurality of character keys. This is for more quickly and accurately identifying a character key to be input among a plurality of character keys by only movements of eyes, and will be described in detail with reference to FIG. 14 and FIG. 15.

The processor 120 may control the display 130 to display at least one word or at least one web page address associated with the first character entered based on the brainwave signal. An embodiment for providing a word or a web page address related to the first character input in the character input window as described above will be described with reference to FIG. 18 and FIG. 19.

The display 130 is a configuration for displaying data. Specifically, the display 130 may be implemented as various types of displays such as a liquid crystal display (LCD), an organic light emitting diode (OLED) display, and a plasma display panel (PDP). The display 130 may also include a driving circuit, a backlight unit, and the like, which may be implemented in the form of an a-si TFT, a low temperature poly silicon (LTPS) TFT, an organic TFT (OTFT). In addition, the display 130 may also be implemented as a flexible display.

As described above, according to the present disclosure, since only the brainwave signals of some channels are used, the time and memory required for signal processing are shortened, and the operation corresponding to the eye movement can be performed in real time.

Figure 3:
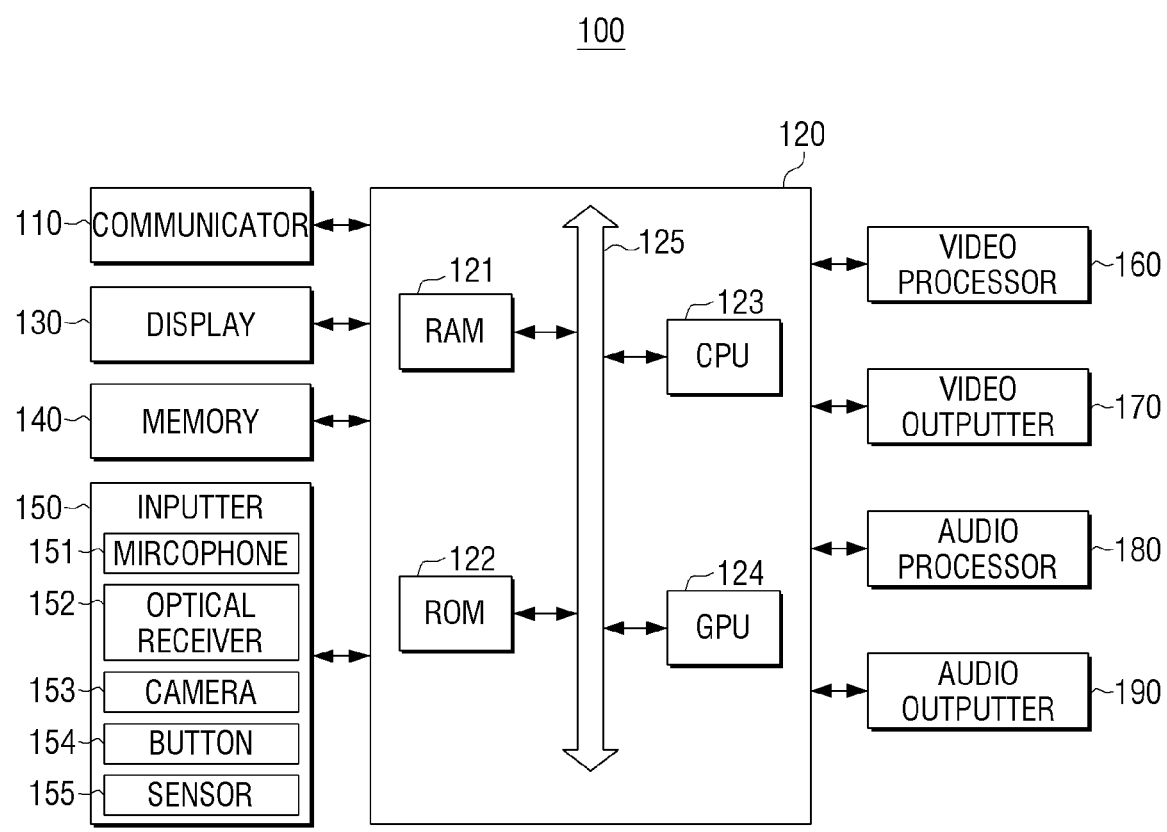
FIG. 3 illustrates a block diagram of a detailed configuration of an electronic apparatus of FIG. 2 according to various embodiments of the present disclosure.

FIG. 3 illustrates a block diagram of a detailed configuration of the electronic apparatus of FIG. 2 according to various embodiments of the present disclosure.

Referring to FIG. 3, the electronic apparatus 100 may include a communicator 110, a processor 120, a display 130, a memory 140, an inputter 150, a video processor 160, a video outputter 170, an audio processor 180 and an audio outputter 190.

Here, the operation of the communicator 110 and the display 130 is the same as that of FIG. 2, and redundant description will be omitted.

The processor 120 may include a RAM 121, a ROM 122, a CPU 123, a Graphic Processing Unit (GPU) 124, and a bus 125. The RAM 121, the ROM 122 the CPU 123, the Graphic Processing Unit (GPU) 124, and the like may be connected to each other via a bus 125.

The CPU 123 accesses the memory 140 and performs booting using the O/S stored in the memory 140. Various operations are performed using various programs, contents, data, and the like stored in the memory 140.

The ROM 122 stores a command set for booting the system and the like. When the turn-on command is input and power is supplied, the CPU 123 copies the O/S stored in the memory 140 to the RAM 121 according to the instruction stored in the ROM 122, executes O/S, and boots the system. When the booting is completed, the CPU 123 copies various programs stored in the memory 140 to the RAM 121, executes the program copied to the RAM 121, and performs various operations.

The GPU 124 displays the UI on the display 130 when the booting of the electronic apparatus 100 is completed. Specifically, the GPU 124 can generate a screen including various objects such as an icon, an image, and text using an operation unit (not shown) and a rendering unit (not shown). The operation unit calculates attribute values such as coordinate values, shapes, sizes, and colors to be displayed by the respective objects according to the layout of the screen. The rendering unit generates screens of various layouts including the objects based on the attribute values calculated by the operation unit. The screen (or user interface window)

generated by the rendering unit is provided to the display 130, and is displayed in the main display area and the sub display area, respectively.

Although the processor 120 has been described as including only one CPU 123 in the above description, the processor 120 may be implemented by a plurality of CPUs (DSP, SoC, etc.).

The memory 140 may store various programs and data necessary for the operation of the electronic apparatus 100. Specifically, the memory 140 may store parameters related to the obtained brainwave signal.

In the memory 140, word or web page address associated with each character may be stored. At this time, the word associated with each character may be acquired in a dictionary previously stored in the memory 140, or may be based on the history of use of the user stored in the memory 140. Meanwhile, the dictionary may be stored in a server connected through the communicator 110. In addition, the address of the web page associated with each character may be pre-stored in the server of the browser, or may be based on the user's usage history stored in the memory 140.

The inputter 150 is a configuration for receiving a user's interaction such as voice of a user, operation of a user, and the like.

Specifically, the inputter 150 includes a microphone 151 for receiving a user's voice, and an optical receiver 152 that receives an optical signal corresponding to a user input (e.g., touch, pressing, touch gesture, voice, or motion), a camera 153 capable of generating an image of the user's motion and an image of the surrounding environment of the electronic apparatus 100, a button 154 formed on an arbitrary area such as a front surface portion, a side surface portion, and a back surface portion of the outer surface of the main body of the electronic apparatus 100, and a sensor 155 for detecting a change in the surrounding environment of the electronic apparatus 100.

Although not shown, according to an exemplary embodiment, the inputter 150 may further include a touch screen for receiving a user's touch.

The video processor 160 is a component for processing the content received through the communicator 110 or the video data included in the content stored in the memory 140. The video processor 160 may perform various image processing such as decoding, scaling, noise filtering, frame rate conversion, resolution conversion, and the like on the video data.

The video outputter 170 can output video data processed by the video processor 160. In this case, when the display 130 is provided in the electronic apparatus 100, the video outputter 170 may have the same configuration as the display 130. However, if the display 130 is not provided in the electronic apparatus 100, or in the case of displaying an image on an external display device, it may be in the form of a port for providing an image signal to an external display device.

The audio processor 180 is a component for processing the content received through the communicator 110 or the audio data included in the content stored in the memory 140. In the audio processor 180, various processes such as decoding or amplification of audio data, noise filtering, and the like may be performed.

The processor 120, when a reproduction application of a multimedia content is executed, may derive the video processor 160 and the audio processor 180 to reproduce the content. At this time, the display 130 may display the image frame generated by the video processor 160 on at least one of the main display area and the sub display area.

The audio outputter 190 outputs the audio data generated by the audio processor 180. In this case, the audio outputter 190 may be configured to convert a voice signal into a sound and output, the sound, such as a speaker provided in the electronic apparatus 100, or to provide a voice signal to an external speaker.

In the above description, the video outputter 170 and the audio outputter 190 are described as separate components. However, when the electronic apparatus 100 includes an HDMI port or the like for simultaneously transmitting a video signal and an audio signal, the video outputter and the audio outputter can be implemented in one configuration.

Meanwhile, when transmitting an image to the external display device through the video outputter 170, the processor 120 may transmit a Graphic User Interface (GUI) added to the transmitted image. Specifically, the processor 120 may transmit a video image to which the GUI is added to the video output from the video processor 160 to the external display device.

In addition, though not illustrated in FIG. 3, it is also possible to further include a USB port for connecting a USB connector in the electronic apparatus 100, various external input ports for connecting various external terminals such as HDMI port, headset, mouse, and LAN and a DMB chip for receiving and processing digital multimedia broadcasting (DMB) signal.

Figure 10:
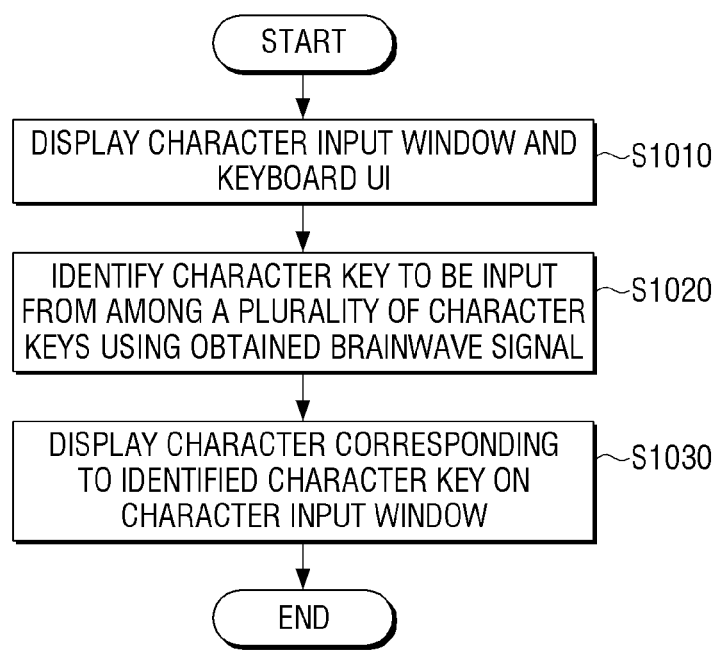
FIG. 10 illustrates a flowchart to describe a controlling method of an electronic apparatus according to various embodiments of the present disclosure.

FIG. 10 illustrates a flowchart to describe a controlling method of an electronic apparatus according to various embodiments of the present disclosure.

Referring to FIG. 10, the electronic apparatus may display a character input window and a keyboard UI (S1010). Specifically, the electronic apparatus can display a keyboard UI including a plurality of character keys when the user focuses the eyes on the displayed character input window. In another embodiment, when the user executes an application requiring character input, the electronic apparatus can display a character input window and a keyboard UI. At this time, the focus of the user's gaze and whether or not the application is executed may be identified by a brainwave signal received from an external device or by an operation command input through input means other than a brainwave signal such as a voice input, a mouse, a remote controller, and a touch screen.

Then, the electronic apparatus can identify a character key to be input among a plurality of character keys using the obtained brainwave signal (S1020). At this time, the electronic apparatus can identify the character key to be input using the waveform of the brainwave signal obtained after the keyboard UI is displayed. Specifically, the electronic apparatus can identify the waveforms of the signals of F7 channel, F8 channel and AF3 channel, and identify the character keys corresponding to the identified waveforms.

At this time, the waveform of the brainwave signal may correspond to the eye movement operation and the blinking operation of the user. Accordingly, the electronic apparatus can move a pointer or a highlight displayed on the screen according to a brainwave signal. Here, the movement of the pointer or the high writer may correspond to the movement of the user's gaze.

The electronic apparatus can display the character corresponding to the identified character key on the character input window (S1030).

Thereafter, though not shown, the electronic apparatus may provide a word or web page address associated with the first character entered based on the brainwave signal. This will be described below with reference to FIGS. 18 and 19.

Figure 11:
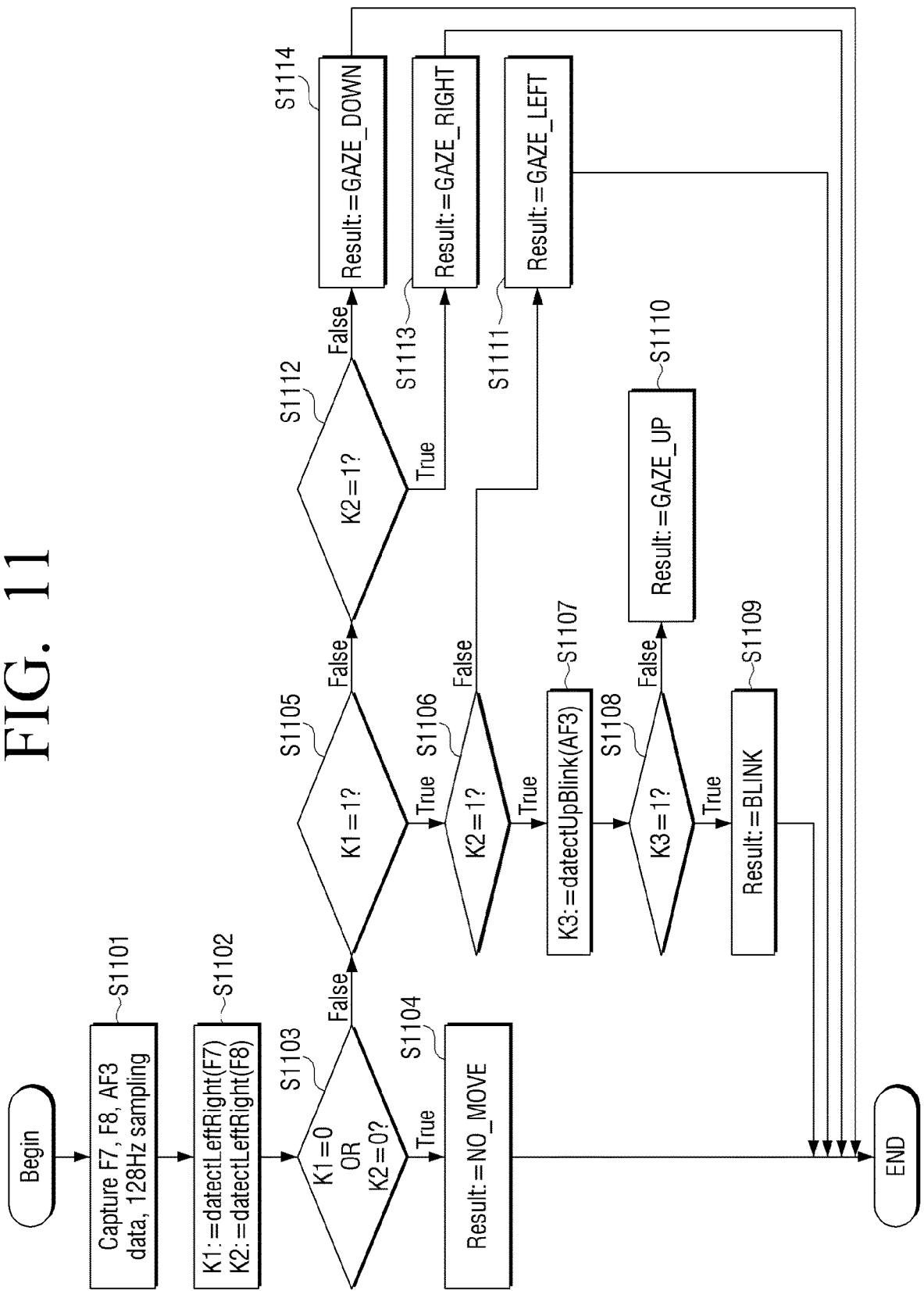
FIG. 11 illustrates a flowchart to describe a process for identifying an operation of eyes using a brainwave signal according to various embodiments of the present disclosure.

FIG. 11 illustrates a flowchart to describe a process for identifying an operation of eyes using a brainwave signal according to various embodiments of the present disclosure.

Referring to FIG. 11, the electronic apparatus can capture signals of F7, F8, and AF3 channels among received brainwave signals (S1101). At this time, the electronic apparatus can sample the received brainwave signal at a frequency of 128 Hz. Here, sampling at a frequency of 128 Hz may mean generating 128 samples per second.

Then, the electronic apparatus can identify the value of K1, which is a parameter for the signal of the F7 channel, and the value of K2, which is a parameter for the signal of the F8 channel (S1102). At this time, the signal of the K7 channel and the signal of the K8 channel can be obtained by moving the eyeball left and right, and downwardly.

Here, the value of the parameter Ki for the signal may correspond to the waveform of the signal of each channel as shown in the following equation (1).

$$K_i = \begin{cases} -1, & \text{signal goes down} \\ 1.5, & \text{signal goes up, wider pulse} \\ 1, & \text{signal goes up, narrower pulse} \\ 0, & \text{otherwise (no major change)} \end{cases}$$

Specifically, if the value of the parameter K is −1, the brainwave signal goes down, and the waveform of the brainwave signal is convex downward. If the value of K is 1.5, the signal goes up and has a wider pulse. The waveform of the brainwave signal is a convex shape having a wide width. If the value of K is 1, the brainwave signal rises and has a narrower pulse, so that the waveform of the brainwave signal has a downward convex shape with a narrow width. On the other hand, if K is 0, it is identified as none, and the electronic apparatus may not perform any other operation.

As described above, the value of K is identified based on the waveform of the brainwave signal, and a method of identifying the value of K will be described in detail with reference to FIG. 12.

The signal waveforms of Table 1 described above are described as the above-mentioned parameter values as shown in Table 2 below

TABLE 2

| Eye movement | $K_1$ | $K_2$ | $K_3$ |
|---|---|---|---|
| Gaze Right (GAZE_RIGHT) | −1 | 1 | Any |
| Gaze Left (GAZE_LEFT) | 1 | −1 | Any |
| Gaze Down (GAZE_DOWN) | −1 | −1 | Any |
| Gaze Up (GAZE_UP) | 1 | 1 | 1.5 |
| [Intentional] Blink (BLINK) | 1 | 1 | 1 |

Here, K1 is a parameter for a signal of F7 channel, K2 is a parameter for a signal of F8 channel, and K3 is a parameter for a signal of AF3 channel.

Then, the electronic apparatus can determine whether the value of K1 or K2 is 0 (S1103). At this time, if the value of K1 or K2 is 0 (S1103—True), that is, if either of K1 and K2 is 0, the electronic apparatus receives the received brainwave signal when the eye of the user has no special motion (S1104).

If neither K1 nor K2 is 0 (S1103—False), the electronic apparatus can identify the values of K1 and K2, respectively. In one embodiment, the electronic apparatus may first identify the value of K1. Specifically, the electronic apparatus can determine whether the value of K1 is 1 (S1105).

If the value of K1 is 1 (S1105—True), the electronic apparatus can determine whether the value of K2 is 1 (S1106). At this time, if the value of K2 is also 1 (S1106—True), the electronic apparatus can identify the value of K3 which is a parameter for the signal of the AF3 channel (S1107). At this time, the signal of the AF3 channel can be obtained by the upward movement of the gaze and blinking of the eyes.

Then, the electronic apparatus can determine whether the value of K3 is 1 (S1108). At this time, if the value of K3 is 1 (S1108—True), the electronic apparatus can perform an operation corresponding to the blinking operation of the user's eyes (S1109). If the value of K3 is not 1 (S1108—False), the electronic apparatus can perform an operation corresponding to the movement of the user's gaze upward (S1110). On the other hand, if the value of K1 is 1 and the value of K2 is not 1 (S1106—False), the electronic apparatus can perform the operation corresponding to the movement of the user's gaze to the left (S1111).

If the value of K1 is not 1 (S1105—False), the electronic apparatus can determine whether the value of K2 is 1 (S1112). At this time, if the value of K2 is 1 (S1112—True), the electronic apparatus can perform an operation corresponding to the movement of the user's gaze to the right (S1113). On the other hand, if the value of K2 is not 1 (S1112—False), the electronic apparatus can perform an operation corresponding to the movement of the user's gaze downward (S1114).

Figure 12:
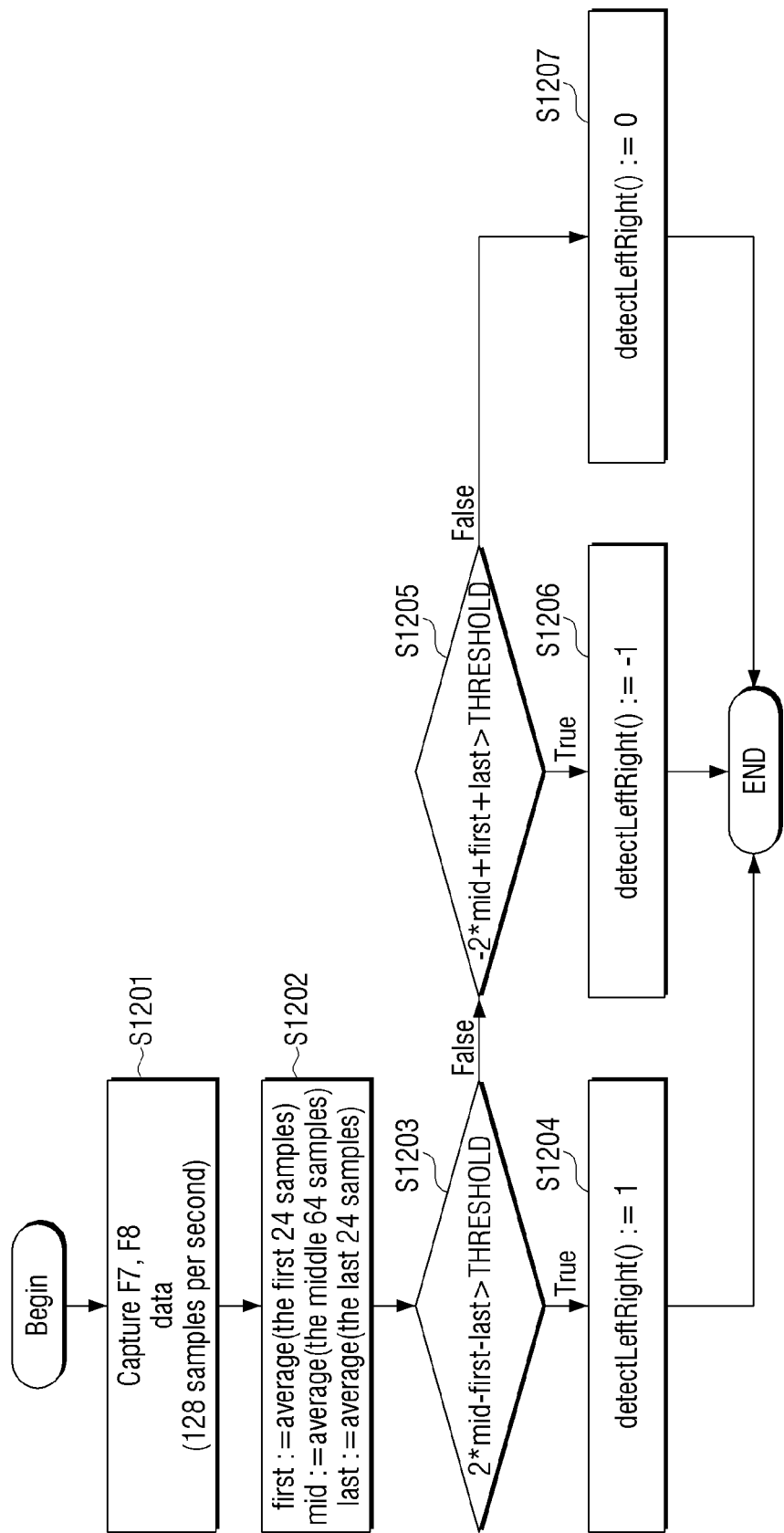
FIG. 12 illustrates a flowchart to describe a process for identifying a waveform of a brainwave signal according to an various embodiments of the present disclosure.

FIG. 12 illustrates a flowchart for explaining a process of identifying a waveform of a signal of an F7 channel and a signal of an F8 channel in a brainwave signal according to various embodiments of the present disclosure. Specifically, FIG. 12 shows the step S1102 of FIG. 11 in more detail.

Referring to FIG. 12, the electronic apparatus can capture signals of F7 and F8 channels among received brainwave signals (S1201). At this time, the electronic apparatus can sample the received brainwave signal at a frequency of 128 Hz. Here, sampling at a frequency of 128 Hz may mean generating 128 samples per second.

The electronic apparatus can divide the signal of each channel into a plurality of sections, and obtain an average value of signal values for each section. In one embodiment, the electronic apparatus can divide the signal of each channel into three sections and obtain an average value of signal values of each section (S1202). Specifically, the electronic apparatus can divide the 24 samples in the front part of the 128 samples into the first section, the 64 samples in the middle section into the second section, and the 24 samples in the rear section into the third section. At this time, a plurality of samples between the first section and the second section and a plurality of samples between the second section and the third section are excluded, and an average value of the signal values can be obtained. This is to clearly identify the waveform except for the transient section where the signal value is changing. Therefore, the first section and the second section may be composed of 32 samples, and 128 samples may be used.

The electronic apparatus can obtain an average value (first) of the signal values of the first section, an average value (mid) of the signal values of the second section, and an average value (last) of the signal values of the third section.

The electronic apparatus may determine whether the 2*mid-first-last value exceeds a preset threshold (S1203). This is a process of determining whether the waveform of the brainwave signal is convex upwardly.

If the 2*mid-first-last value exceeds a predetermined threshold (S1203—True), the electronic apparatus can identify the received signal as having a convex waveform and determine the parameter value corresponding to the signal as one (S1204).

In contrast, if the 2*mid-first-last value is less than or equal to the preset threshold value (S1203—False), the electronic apparatus may determine whether the value of −2*mid+first+last exceeds a predetermined threshold value (S1205). This is the process of determining whether the waveform of the brainwave signal is convex downwardly.

At this time, if −2*mid+first+last value exceeds a predetermined threshold value (S1205—True), the electronic apparatus identifies the received signal as having a downward convex waveform, and determine the parameter value corresponding to the signal as −1 (S1206).

In the meantime, if the value of −2*mid+first+last does not exceed the predetermined threshold value (S1205—False), the electronic apparatus can determine the parameter value corresponding to the received signal as zero (S1207). This may be because the electronic apparatus has identified that the received signal is a non-convex upwardly, non-convex downwardly, and thus is a meaningless waveform.

Figure 13:
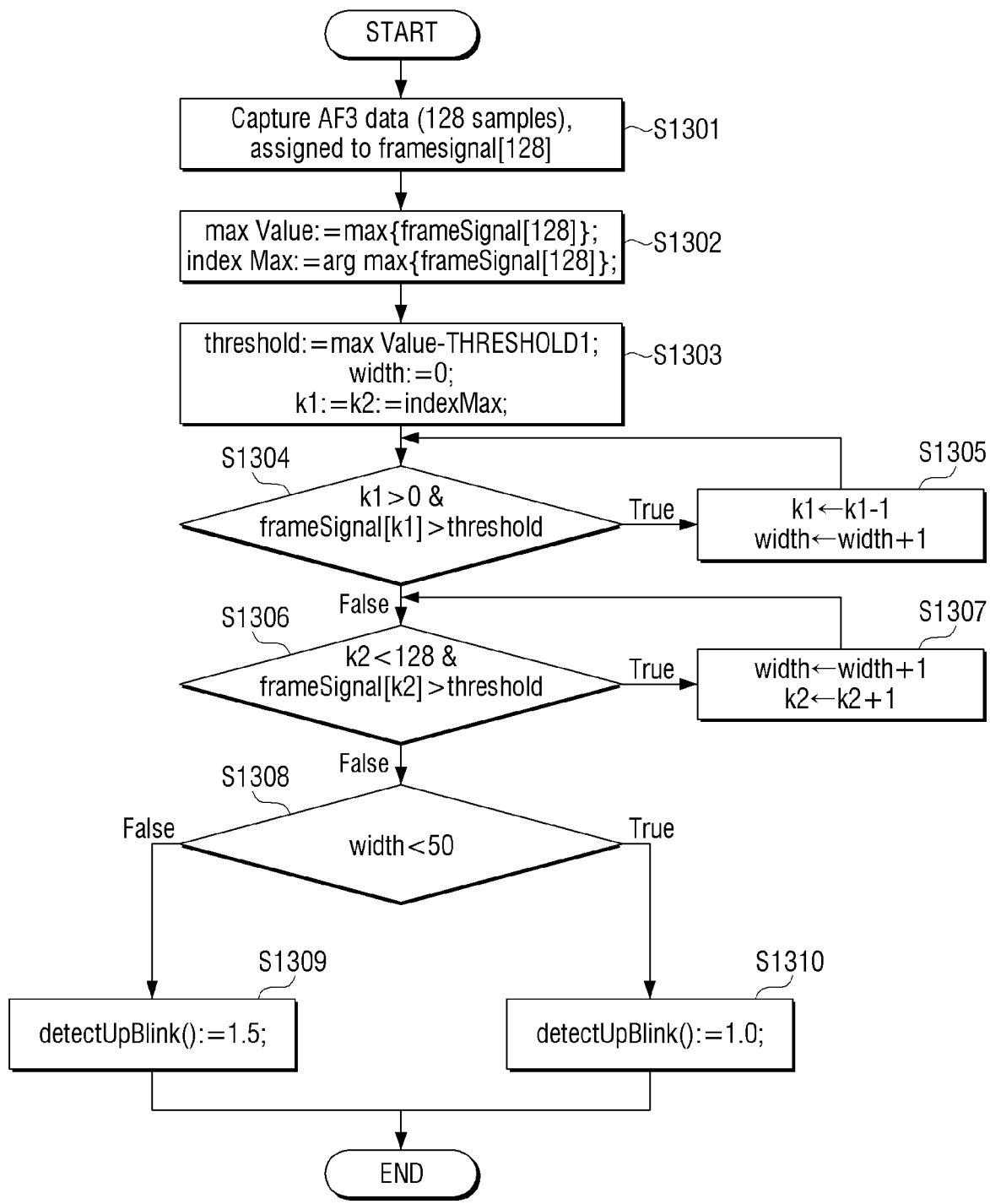
FIG. 13 illustrates a flowchart to describe a process for identifying a movement of eyes using a signal of an AF3 channel according to various embodiments of the present disclosure.

FIG. 13 illustrates a flowchart for explaining a process of identifying a waveform of an AF3 channel signal among brainwave signals according to various embodiments of the present disclosure. Specifically, FIG. 13 shows the step S1107 of FIG. 11 in more detail.

Referring to FIG. 13, the electronic apparatus can capture a signal of the AF3 channel among received brainwave signals (S1301). At this time, the electronic apparatus can sample the received brainwave signal at a frequency of 128 Hz. Here, sampling at a frequency of 128 Hz may mean generating 128 samples per second.

The electronic apparatus may then identify a sample (index Max) having the largest signal value (max Value) and the largest signal value in the sample (S1302).

Next, the electronic apparatus sets a threshold value of the signal value, sets the width to 0, and sets the variables k1 and k2 to the index Max (S1303). Here, the threshold value may be set based on the largest signal value (max Value). For example, the electronic apparatus may set a value (max Value−THRESHOLD1) that is a specific value smaller than the largest signal value to a threshold value of the signal value. At this time, 'THRESHOLD 1' can be empirically set to 55.

Then, the electronic apparatus can identify the width of the left area and the width of the right area based on the index Max in the signal graph, respectively. In this case, the variables k1 and k2 correspond to the order of the samples, k1 is the sample ahead of the index Max, which is used to identify the width of the left area of the index Max in the signal graph, k2 is the sample at the back of the index Max, which can be used to identify the width of the right area of index Max in the graph.

Specifically, the electronic apparatus may determine whether k1 is greater than zero and k1 is greater than a threshold (S1304). At this time, if k1 is greater than 0 and k1 is greater than the threshold value (S1304—True), the electronic apparatus can change k1 to k1−1 and change the width to width+1 (S1305). The electronic apparatus may then perform step S1304 again.

After repeating steps S1304 and S1305, if the value of k1 is smaller than 0 or the value of k1 is smaller than the threshold value (S1304—False), the electronic apparatus identifies the width of the index Max left area, and can determine whether the value of k2 is smaller than the threshold (S1306). At this time, if k2 is smaller than 128 and k2 is larger than the threshold (S1306—True), the electronic apparatus can change k2 to k2+1 and change the width to width+1 (S1307). The electronic apparatus may then perform step S1306 again.

After repeating steps S1306 and S1307, if the value of k2 is greater than 128 or k2 is smaller than the threshold value (S1306—False), the electronic apparatus identifies the width of the right area of the index Max, and identify whether the width is smaller than a predetermined value (S1308). In this case, the width may be the sum of the width of the left area of the index Max and the width of the right area. In one embodiment, the value of the predetermined width may be 50, but is not limited thereto.

At this time, if the width is equal to or greater than the preset value (50 in one embodiment) (S1308—False), the electronic apparatus can identify the signal width of the AF3 channel as wide and determine the parameter value corresponding to the signal as 1.5 (S1309).

If the width is less than the preset value (S1308—True), the electronic apparatus identifies that the width of the signal of the AF3 channel is narrow, and may determine the parameter value corresponding to the signal as 1 (S1310).

Figure 14:
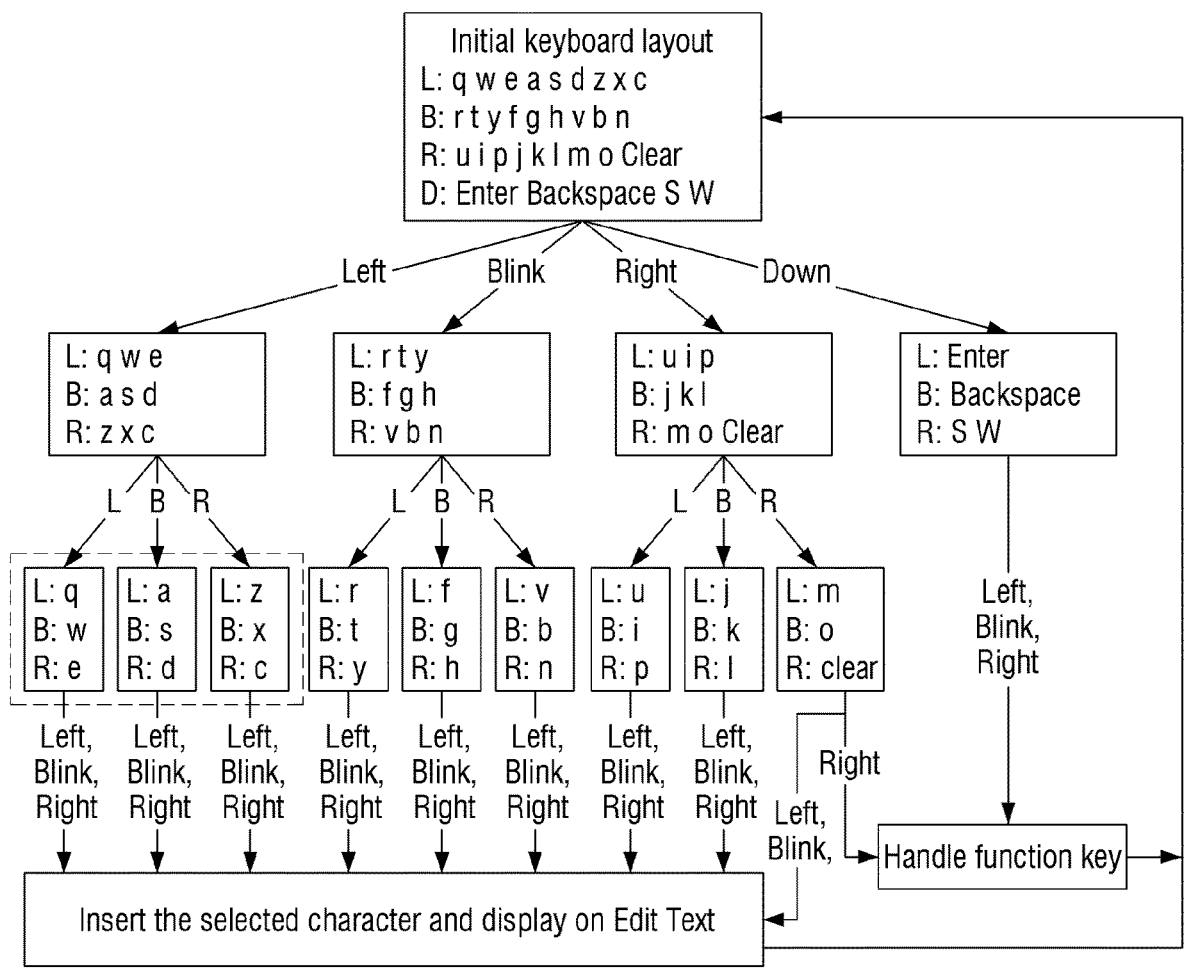
FIG. 14 illustrates a flowchart to describe an exemplary embodiment of a process for selecting a character to be input using an operation of a gaze movement according to various embodiment of the present disclosure.
Figure 15:
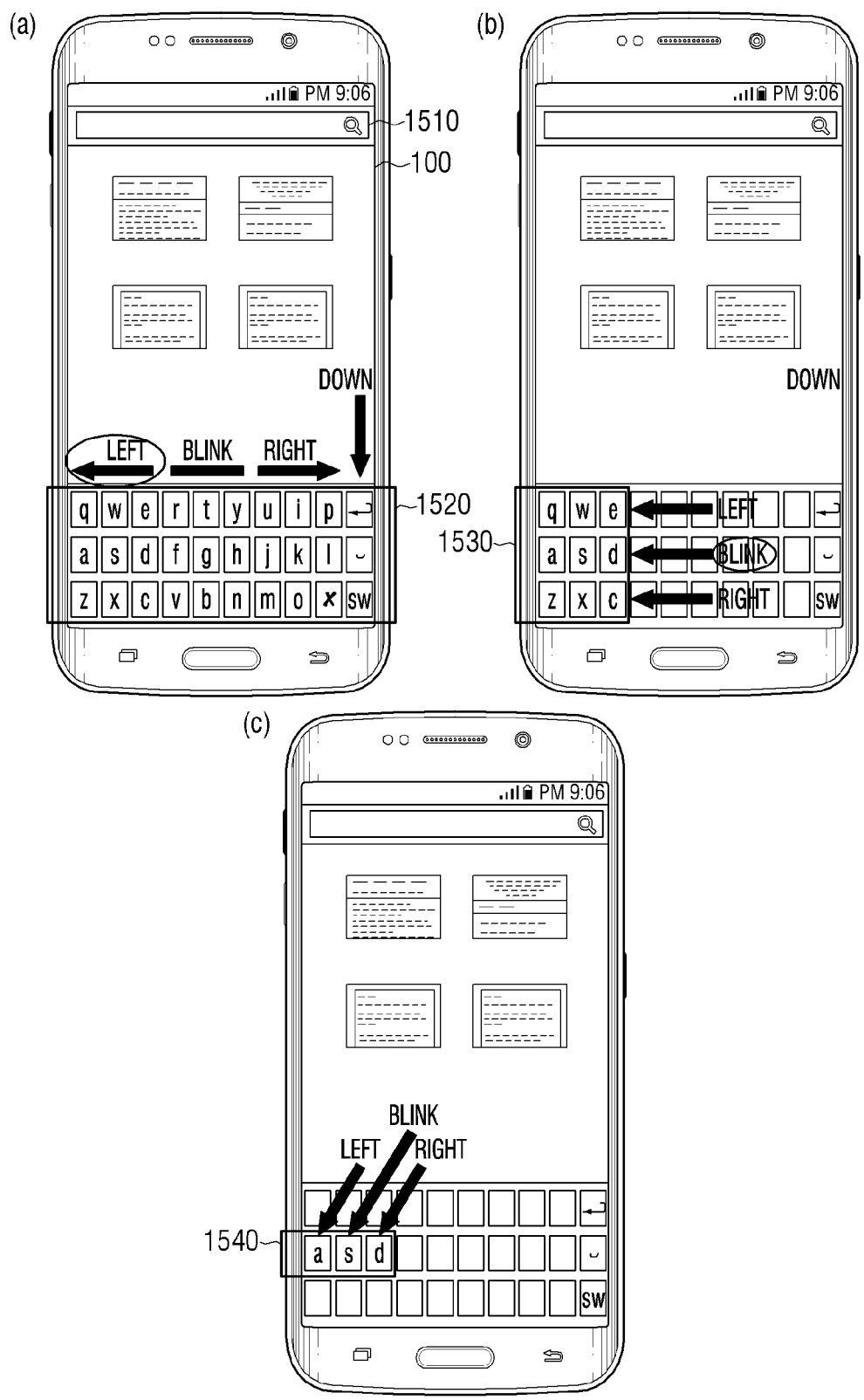
FIG. 15 illustrates a view to describe an UI screen displayed in an exemplary embodiment in which character is selected based on a process illustrated in FIG. 14 according to various embodiments of the present disclosure.

FIGS. 14 and 15 illustrate flowcharts to describe an exemplary embodiment of a process for selecting a character to be input using an operation of a gaze movement according to various embodiments of the present disclosure.

Specifically, the electronic apparatus 100 displays a character input window 1510 as shown in FIG. 15A. When the user's eyes are focused on the displayed character input window 1510, the electronic apparatus 100 may display the keyboard UI 1520. In one embodiment, the keyboard UI 1520 may have 30 character keys arranged in 3 rows and 10 columns.

At this time, the electronic apparatus can display only a part of the plurality of character keys according to the movement of the user's eyes. For example, as shown in FIG. 15A, the left-gazing operation (LEFT) corresponds to the character keys in columns 1 to 3, and the blinking operation (BLINK) corresponds to the characters in columns 4 to 6, right-gazing operation (RIGHT) corresponds to the character keys in columns 7 to 9, and the down-gazing operation (DOWN) corresponds to the character keys in column 10.

As illustrated in FIG. 14, when the keyboard UI is displayed for the first time, the character keys corresponding to the left-gazing operation (LEFT, L) are q, w, e, a, s, d, z, x, and c. The character keys corresponding to the blinking operation (BLINK, B) is r, t, y, f, g, h, v, b, and the character keys corresponding to the right-gazing operation (RIGHT, R) are u, i, p, j, k, l, m, o, Clear, and the character keys corresponding to the operation (DOWN, D) for gazing downward can be Enter, Backspace, shift (SW).

At this time, if the acquired brainwave signal corresponds to the left-gazing operation (LEFT, L), the electronic apparatus may display the keyboard. UI 1530 in which only the character keys of the first to third columns are activated. At this time, the operation (LEFT) for gazing to the left corresponds to the character key of the first row, the blinking operation (BLINK) corresponds to the character keys in the second row, the operation gazing right side corresponds to the character key on the third row, and the operation (DOWN) for gazing downward can correspond to the character key of the tenth row.

That is, as shown in FIG. 14, after gazing at the left side while the keyboard UI is first displayed, the character keys corresponding to the left-gazing, operation (LEFT, L) are q, w, and e, the character keys corresponding to the operations BLINK and B are a, s and d and the character keys corresponding to the operation (RIGHT, R) gazing to the right are z, x and c, and the character keys corresponding to the operation (DOWN, D) gazing downward may still be Enter, Backspace, or Shift (SW).

At this time, if the acquired brainwave signal corresponds to the blinking operation (BLINK, B), the electronic apparatus can display the keyboard UI 1540 in which only the character keys in the second column are activated, as shown in FIG. 15C. At this time, the operation for gazing left (LEFT) corresponds to the character keys of the second row and the first column, the blinking operation (BLINK) corresponds to the character row of the second row and the second column, the operation of gazing right (RIGHT) corresponds to the character keys of the second row and the third column, and the operation of gazing a down direction (DOWN) may correspond to the character keys of the tenth column.

That is, as shown in FIG. 14, while the keyboard UI is displayed first, after gazing a left side and blinking eyes, the character key corresponding to the left-eyeing operation (LEFT, L) is a. The character key corresponding to the blinking operation (BLINK, B) is s, the character key corresponding to the operation (RIGHT, R) gazing to the right is d, and the character key corresponding to the operation (DOWN, D) may still be Enter, Backspace, or Shift (SW).

Thereafter, the electronic apparatus may input a character corresponding to the acquired brainwave signal to the character input window 1510.

Figure 16:
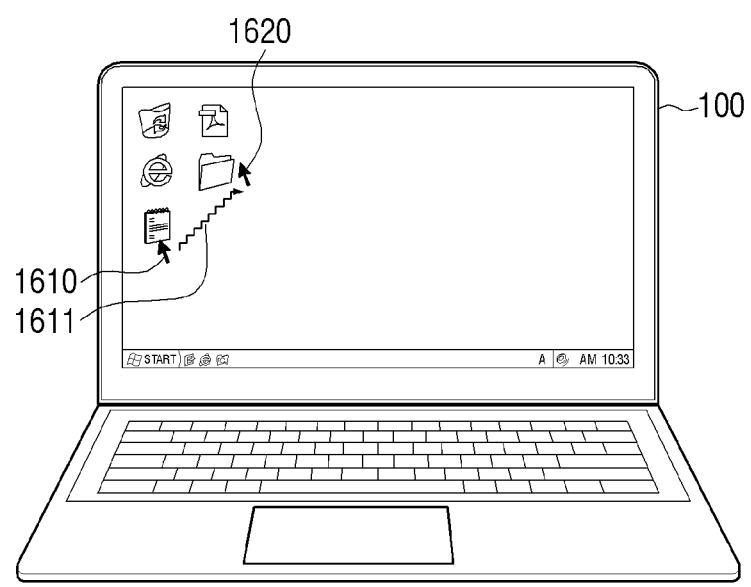
FIG. 16 illustrates a view to describe an exemplary embodiment of moving a cursor using a brainwave signal corresponding to a movement of gaze according to various embodiments of the present disclosure.

FIG. 16 illustrates a diagram for describing an embodiment in which a pointer is moved using a brainwave signal corresponding to eye movement according to various embodiments of the present disclosure.

Referring to FIG. 16, the electronic apparatus 100 can display a free movement of a pointer on a screen based on a brainwave signal obtained from an external device (not shown). For example, the electronic apparatus 100 may move the pointer 1610 pointing to the notepad icon to the position of the pointer 1620 pointing to the folder icon. At this time, the movement of the pointer may correspond to the movement of the user's gaze.

In the present disclosure, since only the brainwave signals corresponding to the four-directional user's gaze movement are used, the electronic apparatus 100 can display the movement of the pointer in the right upward direction by a number of rightward movement and upward movement 1611.

Figure 17:
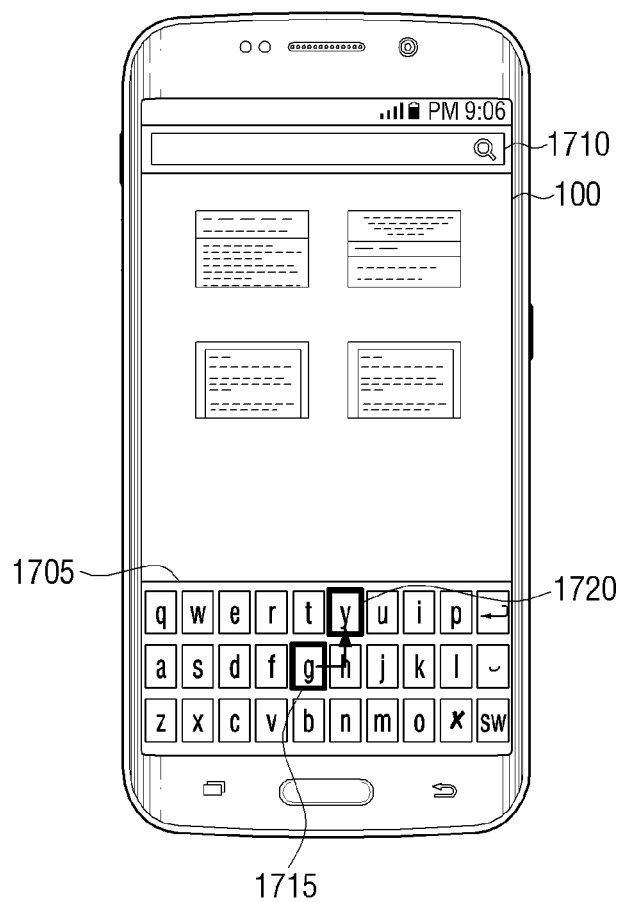
FIG. 17 is a view to describe an exemplary embodiment of moving a highlight using a brainwave signal corresponding to a movement of a gaze according to various embodiments of the present disclosure; and, FIGS. 18 and 19 illustrate views to describe an exemplary embodiment of providing a web page address and a word relating to input of the first character according to various embodiments of the present disclosure.

FIG. 17 illustrates a diagram for describing an embodiment in which a highlight is moved using a brainwave signal corresponding to eye movement according to various embodiments of the present disclosure.

Referring to FIG. 17, the electronic apparatus 100 may display a character input window 1710 and a keyboard UI 1705 including a plurality of character keys. At this time, the electronic apparatus 100 can display the movement of the highlight in the screen based on the brainwave signal obtained from the external device (not shown). Here, the highlight indicates the object to be selected, and the object moves between the objects, which may not be a continuous movement. For example, the electronic apparatus 100 may move the highlight 1715 displayed on the 'g' character key to the highlight 1720 displayed on the 'y' character key. At this time, the movement of the highlight may correspond to the movement of the user's gaze.

In the present disclosure, since only the brainwave signals corresponding to the four-directional user's gaze movement are used, the electronic apparatus 100 can display the movement of the pointer in the right upward direction by a number of rightward movement and upward movement.

Figure 18:
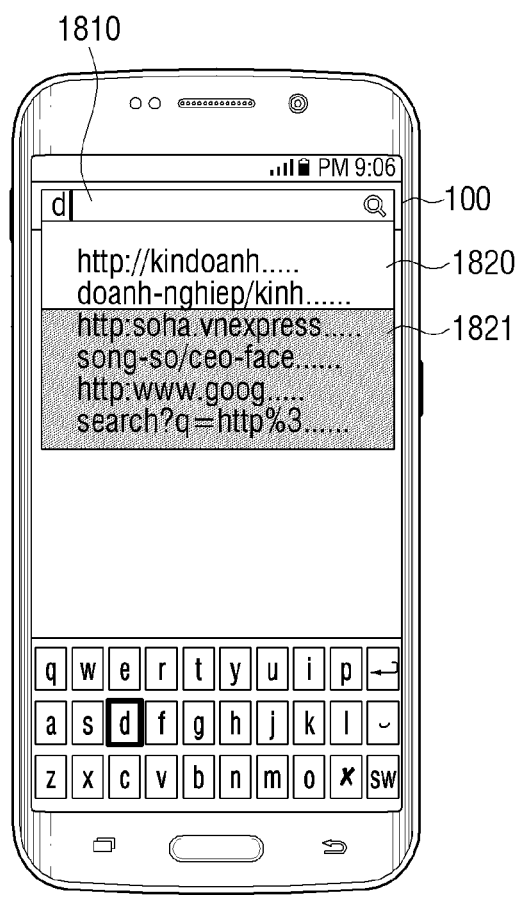
Figure 19:
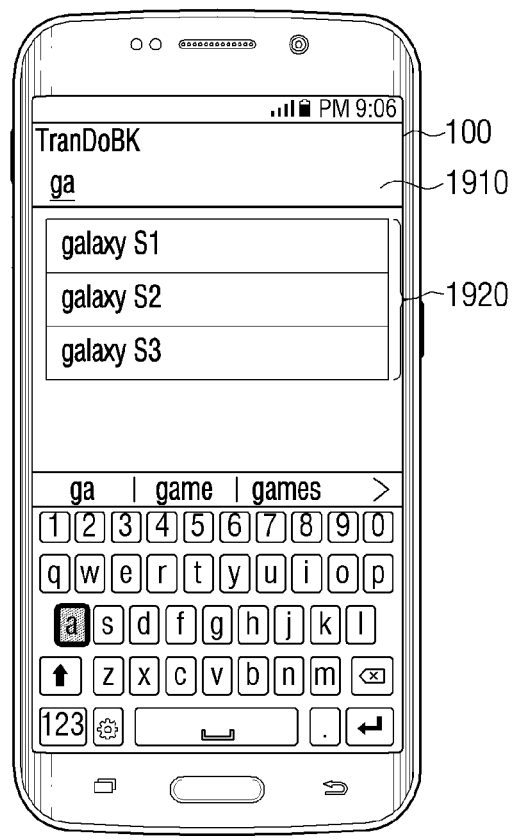

FIGS. 18 and 19 illustrate views for describing an embodiment in which a web page address or a word is provided when a first character is input according to various embodiments of the present disclosure.

As an exemplary embodiment, referring to FIG. 18, if the electronic apparatus 100 identifies a 'd' character key among a plurality of character keys of the keyboard UI, based on the brainwave signal obtained from an external device (not shown), may input 'd' which is a character corresponding to the character key to the character input window 1810. The electronic apparatus 100 may then provide a web page address 1820 associated with the entered characters. At this time, the provided web page address 1820 may be based on the usage history of the user.

The electronic apparatus 100 provides the web page address 1820 and identifies the web page address to be entered based on the received brainwave signal and displays a highlight 1821 indicating the identified web page address. At this time, the highlight 1821 may correspond to the user's gaze. That is, the highlight 1821 can be moved in accordance with the movement of the user's gaze.

If a brainwave signal corresponding to the operation of selecting a specific web page address for a preset time after the web page address 1820 is provided is not received or the user's gaze is out of the area of the web page address 1820 provided, the electronic apparatus 100 may remove the provided web page address 1820 and then identify the character key to be entered after the entered "d" based on the obtained brainwave As an exemplary embodiment, referring to FIG. 19, the electronic apparatus 100 identifies the "g" and "a" character keys among a plurality of character keys of the keyboard UI, based on the brainwave signals obtained from an external device (not shown), and may enter "g" and "a" corresponding to the identified character keys to the character input window 1910. The electronic apparatus 100 may then provide a word 1920 associated with the entered character. At this time, the provided word 1920 may be based on at least one of the user's usage history or dictionary.

Thus, by providing the web page address or word associated with the input character, the user can quickly input the desired character, thereby improving the convenience of the user.

According to various embodiments of the present disclosure described above, the time and memory required for the signal processing can be shortened, the operation corresponding to the eye movement can be performed in real time, and the user can immediately receive feedback on user's operation. In addition, by providing a web page address or a word associated with the input character, the user can quickly input a desired character, thereby improving convenience for the user.

In accordance with a hardware implementation, the embodiments described in this disclosure may be implemented in the fields of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and an electrical unit for performing other functions. In some cases, the embodiments described herein may be implemented by the processor itself. According to a software implementation, embodiments such as the procedures and functions described herein may be implemented in separate software modules. Each of the software modules may perform one or more of the functions and operations described herein.

The control method of an electronic apparatus according to various embodiments of the present disclosure described above may be stored in a non-transitory readable medium. Such non-transitory readable medium can be mounted and used in various devices.

A non-transitory readable medium is not a medium for storing data for a short time such as a register, a cache, a memory, etc., but means a medium that semi-permanently stores data and is capable of being read by a device. In particular, the programs for carrying out the various methods described above may be stored in non-volatile readable media such as CD, DVD, hard disk, Blu-ray disk, USB, memory card, ROM and the like.

According to one embodiment, a method according to various embodiments disclosed herein may be provided in a computer program product. A computer program product may be traded between a seller and a purchaser as a commodity. A computer program product may be distributed in the form of a machine-readable storage medium (e.g.: compact disc read only memory (CD-ROM)) or distributed online through an application store (e.g.: PLAYSTORE). In the case of on-line distribution, at least a portion of the computer program product may be stored temporarily or at least temporarily in a storage medium such as a manufacturer's server, a server of an application store, or a memory of a relay server.

The foregoing exemplary embodiments and advantages are merely exemplary and are not to be construed as limiting the disclosure. The exemplary embodiments may be readily applied to other types of device or apparatus. Also, the description of the exemplary embodiments is intended to be illustrative, and not to limit the scope of the disclosure, and many alternatives, modifications, and variations will be apparent to those skilled in the art.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic apparatus comprising:
   a communicator configured to obtain a brainwave signal;
   a display; and
   a processor operably connected to the communicator and the display, wherein the processor is configured to:
      display, on the display, a character input window and a keyboard user interface (UI) including a plurality of character keys,
      divide the obtained brainwave signal into a plurality of sections,
      identify a waveform of the obtained brainwave signal using an average value of signal values of each section of the plurality of sections,
      identify a character key from the plurality of character keys to input to the character input window corresponding to the identified waveform of the obtained brainwave signal, and
      display a character corresponding to the identified character key in the character input window.

2. The electronic apparatus of claim 1, wherein the obtained brainwave signal is obtained in response to a movement operation of a user's gaze in four directions or an eye blinking operation.

3. The electronic apparatus of claim 1, wherein the obtained brainwave signal comprises:
   a signal from a F7 channel, a signal from a F8 channel, and a waveform from the F7 channel signal and the F8 channel signal,
   wherein each waveform from the F7 channel signal and the F8 channel signal are convex upwardly or convex downwardly according to a left, right, or downward movement of a user's gaze.

4. The electronic apparatus of claim 3, wherein the obtained brainwave signal further comprises:
   a signal from an AF3 channel; and
   a width of a waveform from the AF3 channel signal,
   wherein the width of the waveform from the AF3 channel signal differs based on an upward movement of the user's gaze or eye blinking.

5. The electronic apparatus of claim 2, wherein the processor is further configured to change the displayed plurality of character keys to at least one character key corresponding to the obtained brainwave signal from the displayed plurality of character keys based on a waveform of the obtained brainwave signal.

6. The electronic apparatus of claim 1, wherein the processor is further configured to display, on the display, at least one word or a web page address associated with a first character entered based on the obtained brainwave signal.

7. A method for controlling an electronic apparatus, the method comprising:
   displaying a character input window and a keyboard user interface (UI) including a plurality of character keys;
   dividing an obtained brainwave signal into a plurality of sections;
   identifying a waveform of the obtained brainwave signal using an average value of signal values of each section of the plurality of sections;
   identifying a character key from the plurality of character keys to input to the character input window corresponding to the identified waveform of the obtained brainwave signal; and
   displaying a character corresponding to the identified character key in the character input window.

8. The method of claim 7, wherein to identify the character key from the obtained brainwave signal comprises determining a movement operation of a user's gaze in four directions or an eye blinking operation.

9. The method of claim 7, wherein the obtained brainwave signal comprises
   a signal from a F7 channel and a signal from a F8 channel, and a waveform from the F7 channel signal and the F8 channel signal,
   wherein each waveform from the F7 channel signal and the F8 channel signal are convex upwardly or convex downwardly according to a left, right, or downward movement of a user's gaze.

10. The method of claim 9, wherein the obtained brainwave signal further comprises a signal of an AF3 channel, and a width of a waveform from the AF3 channel signal, wherein the width of the waveform from the AF3 channel signal differs based on an upward movement of the user's gaze or eye blinking.

11. The method of claim 8, further comprising:
    changing the displayed plurality of character keys to at least one character key corresponding to the obtained brainwave signal from the displayed plurality of character keys.

12. The method of claim 7, further comprising:
displaying at least one word or a web page address associated with a first character entered based on the obtained brainwave signal based on a waveform of the obtained brainwave signal.

13. A non-transitory computer-readable medium embodying a computer program, the computer program comprising computer-readable program code that when executed by a processor of an electronic device causes the processor to:
displaying a character input window and a keyboard user interface (UI) including a plurality of character keys;
dividing an obtained brainwave signal into a plurality of sections;
identifying a waveform of the obtained brainwave signal using an average value of signal values of each section of the plurality of sections;
identifying a character key from the plurality of character keys to input to the character input window corresponding to the identified waveform of the obtained brainwave signal; and
displaying a character corresponding to the identified character key in the character input window.

14. The non-transitory computer-readable medium of claim 13, wherein to identify the character key from the obtained brainwave signal, the computer-readable medium further comprising program code that, when executed at the processor, causes the processor to determine a movement operation of a user's gaze in four directions or an eye blinking operation.

\* \* \* \* \*